United States Patent
Apfel et al.

(10) Patent No.: US 11,052,632 B2
(45) Date of Patent: Jul. 6, 2021

(54) NON-CONTINUOUS MESH STRUCTURES

(71) Applicant: Zephyros, Inc., Romeo, MI (US)

(72) Inventors: Jeffrey Apfel, Shelby Township, MI (US); Ron Bogert, Brown City, MI (US)

(73) Assignee: ZEPHYROS, INC., Romeo, MI (US)

( * ) Notice: Subject to any disclaimer, the term of this patent is extended or adjusted under 35 U.S.C. 154(b) by 76 days.

(21) Appl. No.: 16/080,527

(22) PCT Filed: Mar. 2, 2017

(86) PCT No.: PCT/US2017/020534
§ 371 (c)(1),
(2) Date: Aug. 28, 2018

(87) PCT Pub. No.: WO2017/151981
PCT Pub. Date: Sep. 8, 2017

(65) Prior Publication Data
US 2019/0061305 A1    Feb. 28, 2019

Related U.S. Application Data

(60) Provisional application No. 62/302,473, filed on Mar. 2, 2016.

(51) Int. Cl.
*B32B 3/12* (2006.01)
*B32B 5/02* (2006.01)
(Continued)

(52) U.S. Cl.
CPC ............... *B32B 3/12* (2013.01); *B32B 3/266* (2013.01); *B32B 5/022* (2013.01); *B32B 5/18* (2013.01);
(Continued)

(58) Field of Classification Search
CPC .. B32B 3/12; B32B 5/022; B32B 5/18; B32B 5/28; B32B 5/30; B32B 5/32;
(Continued)

(56) References Cited

U.S. PATENT DOCUMENTS 4,769,166 A * 9/1988 Harrison ............... C08J 9/0066
156/78
5,525,663 A * 6/1996 Oien ....................... C08G 18/12
524/590
(Continued)

FOREIGN PATENT DOCUMENTS

CN    101356051 A    1/2009
CN    102438882 A    5/2012
(Continued)

OTHER PUBLICATIONS

Bae et al., "Heating Behavior of Ferromagnetic Fe Particle-Embedded Thermoplastic Polyurethane Adhesive Film by Induction Heating", Journal of Industrial and Engineering Chemistry, vol. 30, pp. 92-97 (Oct. 25, 2015) (Year: 2015).*

(Continued)

*Primary Examiner* — Michael N Orlando
*Assistant Examiner* — Christopher W Raimund
(74) *Attorney, Agent, or Firm* — The Dobrusin Law Firm, P.C.; Bryan S. Lemanski

(57) ABSTRACT

An article comprising a flexible mesh layer pliable enough for being arranged in direct planar contact with a contoured surface, the mesh layer providing one or more attributes of adhering, sealing or reinforcing to a surface receiving the flexible mesh.

20 Claims, 1 Drawing Sheet

(51) Int. Cl.
- *B32B 5/18* (2006.01)
- *B32B 5/28* (2006.01)
- *B32B 5/30* (2006.01)
- *B32B 5/32* (2006.01)
- *B32B 3/26* (2006.01)
- *C09J 7/29* (2018.01)
- *C08K 3/08* (2006.01)
- *C08K 7/18* (2006.01)
- *C08K 3/22* (2006.01)

(52) U.S. Cl.
CPC .............. *B32B 5/28* (2013.01); *B32B 5/30* (2013.01); *B32B 5/32* (2013.01); *C09J 7/29* (2018.01); *B32B 2264/105* (2013.01); *B32B 2307/10* (2013.01); *B32B 2581/00* (2013.01); *B32B 2605/00* (2013.01); *B32B 2605/08* (2013.01); *C08K 3/08* (2013.01); *C08K 7/18* (2013.01); *C08K 2003/2227* (2013.01); *C09J 2301/41* (2020.08); *C09J 2400/263* (2013.01)

(58) Field of Classification Search
CPC .............. B32B 3/266; B32B 2605/00; B32B 2264/105; B32B 2307/10; B32B 2581/00; B32B 2605/08; C09J 7/29; C09J 2205/106; C09J 2400/263; C08K 3/08; C08K 7/18; C08K 2003/2227
See application file for complete search history.

(56) References Cited

U.S. PATENT DOCUMENTS

| | | | |
|---|---|---|---|
| 5,979,902 A | * | 11/1999 | Chang .................. B29C 44/188 277/314 |
| 6,482,486 B1 | * | 11/2002 | Czaplicki .............. B62D 25/04 296/187.02 |
| 2004/0076831 A1 | * | 4/2004 | Hable ..................... B05D 7/02 428/413 |
| 2007/0045866 A1 | * | 3/2007 | Gray ..................... B29C 70/72 257/778 |
| 2010/0192492 A1 | * | 8/2010 | Sultan ..................... E04C 3/29 52/222 |
| 2010/0259059 A1 | * | 10/2010 | Quaderer ............ B62D 29/002 296/39.1 |
| 2016/0016622 A1 | | 1/2016 | Quaderer |

FOREIGN PATENT DOCUMENTS

| | | |
|---|---|---|
| CN | 102741113 A | 10/2012 |
| CN | 105829048 A | 8/2016 |
| CN | 107735257 A | 2/2018 |
| WO | 2015/061291 A1 | 4/2015 |
| WO | 2017/007823 A1 | 1/2017 |

OTHER PUBLICATIONS

ASI, Overcoming Challenges, Adhesives and Sealant Industries, Feb. 1, 2012, https://www.adhesivesmag.com/articles/90579-overcoming-challenges) (Year: 2012).*
International Search. Report and Written Opinion for International Application No. PCT/US2017/020534; dated Jun. 7, 2017.
Chinese First Office Action & Search Report dated Apr. 13, 2020, Application No. 201780014899.4.
2nd Chinese Office Action and Supplementary Search Report, Application No. 201780014899.4 dated Mar. 3, 2021.

* cited by examiner

NON-CONTINUOUS MESH STRUCTURES

TECHNICAL FIELD

The present invention relates generally to adhesive, sealant and structural materials which can be formed as a mesh prior to installation in a location requiring adhering, sealing or structural support.

BACKGROUND

A variety of industries utilize polymer-based materials for sealing and adhering. The use of adhesives and sealants is widespread in the automotive and construction industries as well as in certain consumer product industries such as sporting equipment, shoes, furniture and other goods where strong adhesion and sealing is necessary. However, there are often challenges in locating, using and activating suitable adhesives and sealants onto structures for a variety of reasons. The adhesive/sealant material may be tacky and difficult to handle, it may have a low viscosity, it may be too rigid for application to a curved surface, or it may be too brittle upon cure. In addition, a cured adhesive/sealant may cause deformation to the surface to which it is applied. Furthermore, there is an ongoing effort in many industries to lighten the weight of articles. Efforts to do so often entail reducing the amount of material used for adhering, sealing or providing structural support to an article. However, in reducing the amount of such materials, their efficacy may also be reduced. Furthermore, manufacturing time is increased in the event that material amounts are reduced by only placing the material in select locations.

Notwithstanding the above, there remains a need for effectively reducing the weight of a structure by modifying the format of adhesives, sealants and structural materials. There is a further need for providing a modified sealant material so that it has a requisite amount of strength and structure so that it can be easily die cut to a desired shape and easily applied to a surface with reduced handling challenges. Such modified adhesives, sealants and structural materials may thus be applied in a shape or foam as required and then later activated in some way (e.g., activated to foam, adhere, cure or the like). There is also a need for formation techniques that can allow adhesives, sealants and structural materials to be easily customized to a necessary shape, size, or structure.

SUMMARY OF THE INVENTION

One or more of the above needs are met by the present teachings which an article, comprising at least one solid material layer and a flexible mesh layer pliable enough for being arranged in direct planar contact with a contoured surface, the mesh layer providing one or more attributes of adhering, sealing or reinforcing the solid material layer.

The teachings herein are directed to a an article, comprising a flexible mesh layer pliable enough for being arranged in direct planar contact with a contoured surface, the mesh layer comprising an activatable material and providing one or more attributes of adhering, sealing, reinforcing or acting as a handling film to a surface receiving the mesh layer.

The article may include a solid material layer which receives the mesh layer. The article may include a plurality of rigid spheres dispersed on the solid material layer. The solid material layer may have a thickness (t) and the plurality of rigid spheres may have a max diameter (d) wherein the thickness t is greater than the max diameter d. The article may include a metallic component. The metallic component may comprise a plurality of metallic spheres dispersed onto the solid material layer. The metallic spheres may comprise aluminum oxide spheres. The metallic component may be a metallic filler included in the activatable material. The metallic filler may allow for induction heating of the activatable material. The article may be located in contact with an end of a drain tube to seal an interface between a drain tube and vehicle structure to which the drain tube is attached. The flexible mesh layer may be formed as a sleeve.

The activatable material may be an expandable material. The flexible mesh may be located onto a vehicle pillar, rocker or other vehicle frame member. The flexible mesh may be sufficiently flexible that it collapses under its own weight when held at one end. The flexible mesh may be formed having a plurality of repeating generally diamond shaped, rectangular, circular or square openings. A fastener may be located into an opening of the flexible mesh to hold the mesh in place at a desired location. The fastener may have a head portion having a diameter that is larger than the diameter of the opening in the flexible mesh that receives the fastener. The activatable material may expand upon exposure to a stimulus and any openings in the mesh become closed as a result of expansion of the material. The openings formed in the mesh may allow for a consistent thickness of the activatable material post expansion and may prevent unwanted surface irregularities from forming in the expanded material.

The activatable material may include a magnetic filler allowing the flexible mesh to be magnetically adhered to a metallic surface prior to activation. The activatable material may be a sound and/or vibration damping material. The flexible mesh may be laminated onto a metallic shim stock layer. The flexible mesh may be included as a layer within a composite structure. The flexible mesh may be located onto an aluminum surface, a steel surface, a polyethylene terephthalate, or a thermoplastic epoxy surface. The flexible mesh may comprise a thermoplastic epoxy material. The flexible mesh may be heat bonded or otherwise adhered to a woven or non-woven fibrous material. The flexible mesh may be located onto a panel structure for forming a patch to stiffen the panel structure.

The openings formed in the mesh may assist in reducing read-through on the panel surface that opposes the patch. The flexible mesh may be utilized in an injection molding process to provide dimensional stability to an injection molded material. The flexible mesh may be located onto a first surface of an adhesive or sealant material as a handling layer and the second surface of the adhesive or sealant material is covered by a release liner. The release liner may be perforated and a plurality of metallic spheres are located onto the perforated portions of the adhesive or sealant material so that the metallic spheres adhere to the adhesive or sealant only at the perforated portions where the adhesive or sealant is exposed. A plurality of metallic spheres may be located onto the adhesive or sealant material through the openings in the flexible mesh so that the metallic spheres adhere to the adhesive or sealant only at the openings in the flexible mesh where the adhesive or sealant is exposed. The metallic spheres may be located into a tray and the adhesive or sealant is brought into contact with the tray so that the metallic spheres adhere to the adhesive or sealant where it is exposed. The perforations may be formed in a desired pattern so that the metallic spheres are located in only specific locations as required for sealing a joint or facilitating an induction heating process.

The metallic spheres may be heated prior to deposition onto the article. The flexible mesh may be formed by extrusion, die-cutting, or laser cutting. Each opening in the flexible mesh may receive an average of at least 1 metallic sphere, at least 3 metallic spheres, at least 4 metallic spheres, at least 6 metallic spheres or even at least 8 metallic spheres. The flexible mesh may be located onto a vehicle surface for bonding to an interior vehicle component. The interior vehicle component may include one or more curved surfaces and the flexible nature of the flexible mesh allows for conforming to the shape of the vehicle component. The flexible mesh may be formed of a material that expands which provides a soft interface material between the vehicle surface and the interior vehicle component. The flexible mesh may be formed of at least two distinct materials. A first material may be laid in a first direction and a second material may be laid in a second direction that is different from the first direction. The flexible mesh may be located onto a fiberglass layer. The mesh may be located onto a vehicle door beam.

The teachings herein further contemplate use of the article of any one of the preceding claims as an acoustic blanket. The teachings are also directed to a method comprising extruding a sealant material layer, laminating a mesh handling material layer onto the first sealant material layer to form a composite sealing structure, die-cutting the composite sealing structure to form a desired shape and dispensing a plurality of rigid spheres onto the composite sealing structure, so that the rigid spheres adhere to the sealant material but not the mesh handling layer. The method may also include locating the composite sealing structure in between two members to seal a joint between the two members.

DETAILED DESCRIPTION

Figure 1:
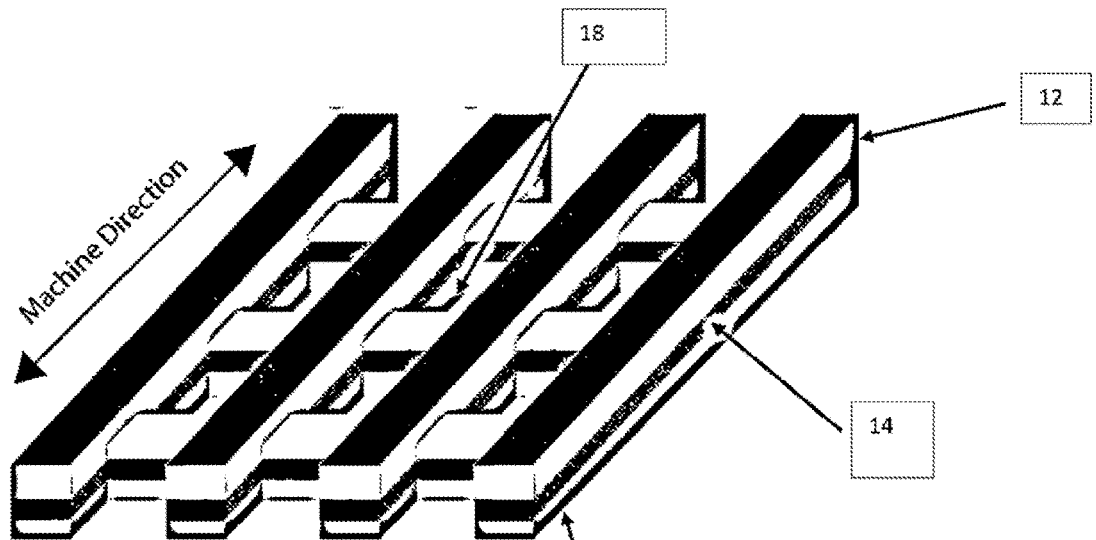
FIG. 1 is a perspective view of one illustrative embodiment in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/302,473, filed Mar. 2, 2016, the entirety of the contents of that application being hereby incorporated by reference for all purposes.

The adhesive, sealing and reinforcing materials described herein are preferably formed (e.g., molded, cut, extruded, die-cut or the like) as a non-continuous or "mesh" material including a plurality of sequential openings. It is possible that each opening will have the same shape and size of any adjacent openings such that each opening is identical. However it is also possible that the openings be formed in differing shapes and sizes. The flexible mesh may be formed having a plurality of repeating generally diamond shaped, rectangular, circular or square openings. The resulting mesh may be a flexible material such that it would collapse under its own weight when held at an end. The flexible nature of the mesh may allow it to be located onto a curved (e.g., contoured) surface so that it lies in direct planar contact with a curved surface. As a result adhesion/sealing is typically more uniform and avoids deformation of any surfaces opposing the surface adhered to. The flexible mesh layer may be formed as a sleeve.

The mesh may be applied as a handling layer to a solid material layer. It is also possible that as a handling layer, the openings in the mesh permit the addition of particles (e.g., spheres, metallic spheres, or the like). Thus, the solid material may receive a plurality of rigid spheres dispersed on the solid material layer. The solid material layer may have a thickness (t) and the plurality of rigid spheres may have a max diameter (c) wherein the thickness t is greater than the max diameter d.

The mesh may be formed of a material having a metallic component. The metallic component may be a metallic filler included in the activatable material. The metallic filler may allow for induction heating of the activatable material.

The mesh may be located in contact with an end of a drain tube to seal an interface between a drain tube and vehicle structure to which the drain tube is attached. The flexible mesh may be located onto a vehicle pillar, rocker or other vehicle frame member. The flexible mesh may be laminated onto a metallic shim stock layer. The flexible mesh may be included as a layer within a composite structure. The flexible mesh may be located onto an aluminum surface, a steel surface, a polyethylene terephthalate, or a thermoplastic epoxy surface. The flexible mesh may be heat bonded or otherwise adhered to a woven or non-woven fibrous material. The flexible mesh may be located onto a panel structure for forming a patch to stiffen the panel structure. The openings formed in the mesh may assist in reducing read-through on the panel surface that opposes the patch. The flexible mesh may be located onto a fiberglass layer. The mesh may be located onto a vehicle door beam.

A fastener may be located into an opening of the flexible mesh to hold the mesh in place at a desired location. The fastener may have a head portion having a diameter that is larger than the diameter of the opening in the flexible mesh that receives the fastener.

The activatable material may include a magnetic filler allowing the flexible mesh to be magnetically adhered to a metallic surface prior to activation. The activatable material may be a sound and/or vibration damping material.

The flexible mesh may be located onto a first surface of an adhesive or sealant material as a handling layer and the second surface of the adhesive or sealant material is covered by a release liner. The release liner may be perforated and a plurality of metallic spheres are located onto the perforated portions of the adhesive or sealant material so that the metallic spheres adhere to the adhesive or sealant only at the perforated portions where the adhesive or sealant is exposed. A plurality of metallic spheres may be located onto the adhesive or sealant material through the openings in the flexible mesh so that the metallic spheres adhere to the adhesive or sealant only at the openings in the flexible mesh where the adhesive or sealant is exposed. The metallic spheres may be located into a tray and the adhesive or sealant is brought into contact with the tray so that the metallic spheres adhere to the adhesive or sealant where it is exposed. The perforations may be formed in a desired pattern so that the metallic spheres are located in only specific locations as required for sealing a joint or facilitating an induction heating process. The metallic spheres may be heated prior to deposition onto the article. Each opening in the flexible mesh may receive an average of at least 1 metallic sphere, at least 3 metallic spheres, at least 4 metallic spheres, at least 6 metallic spheres or even at least 8 metallic spheres.

The flexible mesh may be formed by extrusion, die-cutting, or laser cutting. The flexible mesh may be located onto a vehicle surface for bonding to an interior vehicle component. The interior vehicle component may include one or more curved surfaces and the flexible nature of the flexible mesh allows for conforming to the shape of the vehicle component. The flexible mesh may be formed of a material that expands which provides a soft interface material between the vehicle surface and the interior vehicle component.

The flexible mesh may be formed of at least two distinct materials as described herein. A first material may be laid in a first direction and a second material may be laid in a second direction that is different from the first direction. The first direction may be at an angle that is skew as related to the angle of the second direction.

The activatable material for forming the mesh may be an expandable material. The activatable material may expand upon exposure to a stimulus and any openings in the mesh become closed as a result of expansion of the material. The openings formed in the mesh may allow for a consistent thickness of the activatable material post expansion and may prevent unwanted surface irregularities from forming in the expanded material.

The teachings herein include the formation of an adhesive, sealant or structural material into a mesh sheet for use in bonding. The bonding may occur with a vehicle interior structure or may involve bonding of metallic components that form the frame/panel/cavity portions of a vehicle. Typically vehicle interior materials include the use of polypropylene as support structures and there are a number of challenges in bonding a secondary material (e.g., an interior material) to polypropylene. The teachings herein are directed to a polymer-based adhesive. The polymer-based adhesive may include the addition of a metallic component (e.g., a ferromagnetic material as one example) so that upon exposing the adhesive described herein to an induction heating source, the adhesive activates quickly and the induction heating source causes the temperature of the interface between the adhesive and the polypropylene to a temperature of at least about 300° F., at least about 400° F., or even at least about 500° F., thereby causing improved adhesion to the polypropylene.

An adhesive/sealant mesh in accordance with the present teachings may be applied along the entirety of, or alternatively along only a portion of the surface to which adhesion is desired. Furthermore, the activated adhesive/sealant mesh described herein, may impart a desired flexibility to the surface due to the soft to the touch nature of the activated adhesive. The adhesive/sealant mesh is both lighter than a typical full sheet of adhesive/sealant and is also easier to apply to a surface of the interior panel. Furthermore, in the event that a surface to which the adhesive/sealant mesh is applied is a curved surface, the mesh arrangement is much easier to apply in a curved fashion than a solid sheet of adhesive/sealant.

It is also possible that the adhesive/sealant mesh may activate to expand (e.g., foam), such expansion acting to bridge a gap in between two surfaces. Efforts to bond two fairly large surfaces often result distortion, warping, or buckling of one or more of the surfaces during heating. The mesh arrangement (e.g., netting) acts to break up the internal stress caused by adhesion and movement. Therefore deleterious effects on the surfaces are minimized upon exposure to heat.

The mesh format described herein may also be used for materials that are considered, structural support materials. One such material is a stiffening patch which may be utilized to stiffen a portion of or an entirety of a panel utilized in a transportation vehicle. To address fuel economy (CAFE standards) vehicles are being manufactured utilizing thinner gauged metal. Thinner metal is also more flexible which can require, depending on location and contour/styling, a strategically placed panel stiffener on the inside of a panel to improve the stiffness. Panel stiffeners are typically engineered to be strong and rigid. These combined opposing properties can cause a visible distortion of the metal surface known as read-through. Thermosetting panel stiffeners typically yield high exotherms and shrink during the crosslinking process and further distort the substrate surface. The use of a structural support material in a mesh format acts to minimize or even eliminate the visible distortion caused by stress from thermal expansion and also diffuses the heat caused by crosslinking. Continuous stiffening structures (e.g., those without openings as in the described mesh material) tend to negatively focus the stress caused by the coefficient of thermal expansion of the panel substrate and the stiffener patch which leads to a distinct visible profile of the stiffener patch that telegraphs through Class A surfaces such as automotive surfaces. Breaking up the stress into smaller "zones" (e.g., by use of the discontinuous mesh format) diffuses the concentration of the stress and thus diffuses the read-through.

The mesh may comprise more than one material. As one non-limiting example, two different materials (e.g., different adhesives, sealants, or structural materials or some combination thereof), may be arranged in opposing directions so that rows of a first material are arranged perpendicular to rows of a second material for forming the mesh. Alternatively, the different materials can be arranged in alternating layers to form a mesh composite. One mesh material could be elastomeric or magnetic for attachment purposes while the other material is a panel stiffener adhesive. One mesh material could be tuned to counter the effect of thermal expansion and cure shrinkage. A first mesh layer may serve as an attachment layer. A second mesh layer may serve as a structural panel stiffener layer. A third mesh layer may be a fiberglass bonding layer. A first mesh layer may serve as an attachment layer. A second mesh layer may serve as a structural panel stiffener layer. A third mesh layer may be a carrier layer. A first mesh layer may serve as panel stiffening layer. A second mesh layer may serve as a tensile strength increasing layer (e.g., fiberglass).

The mesh may be formed as a sleeve to surround a portion of a part. The mesh material may expand to cover a desired area of that part after activation. Specifically, the mesh sleeve may be fitted about a vehicle door beam or roof bow. The mesh sleeve may be self-fastening. The mesh sleeve may be formed of multiple layers.

The mesh may be used to provide acoustic properties. The mesh may be formed as an acoustic blanket to prevent or at least attenuate the transmission of sound through a vehicle cavity.

The mesh may comprise a lightweight expandable acoustic foam. As one example, about 1.5 pounds of mesh may cover 25 square feet of area with 4 mm of foam. The mesh size (e.g., the size of the openings located within the mesh) can be tuned for continuous coverage so that the expanding foam grid grows into itself forming a continuous layer. A full sheet of continuous coverage expandable material can lead to internal expansion stress which causes undesirable buckling and unwanted voids. The mesh configuration isolates the stress into predictable patterns. The mesh configuration conforms to curved surfaces better than a continuous configuration. The structure (e.g., size, shape, and configuration) of the mesh and the material itself can be tuned to create "acoustic" pockets.

The materials for forming the mesh described herein can be selected from a wide variety of materials but may be selected from adhesives, sealants and structural support materials. The mesh material may include one or more additional polymers or copolymers, which can include a variety of different polymers, such as thermoplastics, elastomers, plastomers combinations thereof or the like. For example, and without limitation, polymers that might be appropriately incorporated into the polymeric admixture include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprises a small portion or a more substantial portion of the mesh material (e.g., up to 85% by weight or greater). Preferably, the one or more additional polymers comprises about 0.1% to about 50%, more preferably about 1% to about 20% and even more preferably about 2% to about 10% by weight of the mesh material.

The mesh materials may include one or more polymeric materials including one or more ethylene copolymers and/or terpolymers. The ethylene copolymers and/or terpolymers may include but are not limited to ethylene methyl acrylate (EMA) and/or ethylene vinyl acetate (EVA). At least about 20%, at least 40%, or even at least 60% of the mesh material may comprise an ethylene copolymer.

The mesh materials may also include epoxy-based materials, which may contain an epoxy resin. Epoxy resin is used herein to mean any of the conventional dimeric, oligomeric or polymeric epoxy materials containing at least one epoxy functional group. Moreover, the term epoxy resin can be used to denote one epoxy resin or a combination of multiple epoxy resins. The mesh materials may be epoxy-containing materials having one or more oxirane rings polymerizable by a ring opening reaction. In preferred embodiments, the mesh material includes up to about 80% or more of an epoxy resin. More preferably, the mesh material includes between about 2% and 70% by weight epoxy resin, more preferably between about 4% and 30% by weight epoxy resin and even more preferably between about 7% and 18% by weight epoxy resin. Of course, amounts of epoxy resin may be greater or lower depending upon the intended application of the mesh material. As an example, it is contemplated that weight percentages may be lower or higher when other ingredients such as the adduct, filler, alternative polymers, combinations thereof or the like are used in greater or lesser weight percentages.

The epoxy may be aliphatic, cycloaliphatic, aromatic or the like. The epoxy may be supplied as a solid (e.g., as pellets, chunks, pieces or the like) or a liquid (e.g., an epoxy resin). As used herein, unless otherwise stated, a resin is a solid resin if it is solid at a temperature of 23° C. and is a liquid resin if it a liquid at 23° C. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the mesh material to increase the adhesion, flow properties or both of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Moreover, various mixtures of several different epoxy resins may be employed as well. Examples of suitable epoxy resins are sold under the tradename DER® (e.g., DER 331, DER 661, DER 662), commercially available from the Dow Chemical Company, Midland, Mich.

The mesh material may also include one or more adducts. While it is contemplated that various polymer/elastomer adducts may be employed according to the present invention, one preferred adduct is an epoxy/elastomer adduct. An elastomer-containing adduct may be employed in the mesh material of the present invention in a relatively high concentration. The epoxy/elastomer hybrid or adduct may be included in an amount of up to about 80% by weight of the adhesive material. More preferably, the elastomer-containing adduct is approximately at least 5%, more typically at least 7% and even more typically at least 10% by weight of the mesh material can be up to 60% or more, but more preferably is about 10% to 30% by weight of the mesh material. Of course, the elastomer-containing adduct may be a combination of two or more particular adducts and the adducts may be solid adducts or liquid adducts at a temperature of 23° C. or may also be combinations thereof. In one preferred embodiment, the adduct is composed of substantially entirely (i.e., at least 70%, 80%, 90% or more) of one or more adducts that are solid at a temperature of 23° C.

The adduct itself generally includes about 1:5 to 5:1 parts of epoxy or other polymer to elastomer, and more preferably about 1:3 to 3:1 parts or epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons, hydrocarbon resins and the like. In one embodiment, recycled tire rubber is employed. An example of a preferred epoxy/elastomer adducts is sold under the tradename HYPDX RK 8-4 commercially available from CVC Chemical. Examples of additional or alternative epoxy/elastomer or other adducts suitable for use in the present invention are disclosed in U.S. Patent Publication 2004/0204551, which is incorporated herein by reference for all purposes.

The elastomer-containing adduct, when added to the mesh material, preferably is added to modify structural properties of the mesh material such as strength, toughness, stiffness, flexural modulus, or the like. Additionally, the elastomer-containing adduct may be selected to render the mesh material more compatible with coatings such as water-borne paint or primer system or other conventional coatings.

In certain embodiments, it may be desirable to include one or more thermoplastic polyethers and/or thermoplastic epoxy resins in the mesh material. When included, the one or more thermoplastic polyethers preferably comprise between about 1% and about 90% by weight of the mesh material, more preferably between about 3% and about 60% by weight of the mesh material and even more preferably between about 4% and about 25% by weight of the mesh material. As with the other materials, however, more or less thermoplastic polyether may be employed depending upon the intended use of the mesh material.

The mesh material may have at least one epoxide group may be a hydroxy-phenoxyether polymer, such as a polyetheramine thermoplastic material as described herein. For example, such thermoplastic polymeric material having at least one epoxide group may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis (secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093, which are incorporated herein by reference for all purposes. Advantageously, the thermoplastic polyethers can provide the mesh material with various desirable characteristics such as desirable physical and chemical properties for a wide variety of applications as is further described herein.

It is possible that the mesh material includes at least one impact modifier. As used herein, like with any other ingredients of the present invention, the term "impact modifier" can include one impact modifier or plural impact modifiers. Various impact modifiers may be employed in the practice of the present invention and often include one or more elastomers. It is generally preferable for the impact modifier to be at least 4%, more typically at least 7%, even more typically at least 10%, still more typically at least 13% and even still more typically at least 16% by weight of the mesh material and also preferable for the impact modifier to be less than 90%, more typically less than 40% an even more typically less than 30% by weight of the mesh material, although higher or lower amounts may be used in particular embodiments.

In one embodiment of the present invention, the impact modifier includes at least one shell/core impact modifier and preferably the impact modifier includes a substantial portion of core/shell impact modifier. In one preferred embodiment, the impact modifier is comprised of at least 60%, more typically at least 80% and even more typically at least 97% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell impact modifiers are formed by emulsion polymerization followed by coagulation or spray drying. It is also preferred for the impact modifier to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

One or more blowing agents may be added to the mesh material for producing inert gasses that form, as desired, an open and/or closed cellular structure within the mesh material. In this manner, it may be possible to lower the density of articles fabricated from the material. In addition, the material expansion can help to improve sealing capability, acoustic damping or both.

The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,-oxy-bis-(benzenesulphonylhydrazide), trihydrazinotriazine and $N,N_i$-dimethyl-$N,N_i$-dinitrosoterephthalamide.

An accelerator for the blowing agents may also be provided in the mesh material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the mesh material depending upon the type of cellular structure desired, the desired amount of expansion of the mesh material, the desired rate of expansion and the like. Exemplary ranges for the amounts of blowing agents and blowing agent accelerators in the mesh material range from about 0.001% by weight to about 5% by weight and are preferably in the mesh material in fractions of weight percentages.

In one embodiment, the present invention contemplates the omission of a blowing agent. Preferably, however, the material, the blowing agent or both of the present invention are thermally activated. Alternatively, other agents may be employed for realizing activation by other means, such as moisture, radiation, or otherwise.

One or more curing agents and/or curing agent accelerators may be added to the mesh material. Amounts of curing agents and curing agent accelerators can, like the blowing agents, vary widely within the mesh material depending upon the type of cellular structure desired, the desired amount of expansion of the mesh material, the desired rate of expansion, the desired structural properties of the mesh material and the like. Exemplary ranges for the curing agents or curing agent accelerators present in the mesh material range from about 0.001% by weight to about 7% by weight.

Preferably, the curing agents assist the mesh material in curing by crosslinking of the polymers, epoxy resins or both. It is also preferable for the curing agents to assist in thermosetting the mesh material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the mesh material. The mesh material may also include one or more fillers, including but not limited to particulated materials (e.g., powder), beads, microspheres, or the like. Preferably the filler includes a material that is generally non-reactive with the other components present in the mesh material. While the fillers may generally be present within the mesh material to take up space at a relatively low weight, it is contemplated that the fillers may also impart properties such as strength and impact resistance to the mesh material.

Examples of fillers include calcium carbonate, silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the mesh material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

A non-limiting example sealant/adhesive formulation for the mesh is provided below:

TABLE A

| Chemical Name | Percent of Formula |
|---|---|
| Ethylene Methyl Acrylate Copolymer | 25.00 |
| Ethylene Vinyl Acetate Copolymer | 20.00 |
| Oxidized Synthetic Paraffin | 20.71 |

TABLE A-continued

| Chemical Name | Percent of Formula |
|---|---|
| DGEBPA-based polymer | 3.00 |
| Dicumyl Peroxide (40%) & Kaolin (60%) | 1.00 |
| Cyanoguanidine | 0.20 |
| Aromatic Hydrocarbon Resin | 7.74 |
| Ground High Calcium Carbonate | 22.25 |
| Carbon Black | 0.10 |
| Total | 100.00 |

The mesh as described herein may be utilized as a handling layer for an adhesive/sealant material which may be tacky and may also be activatable (e.g., expandable). Non-limiting examples of such adhesives are set forth in Table B:

TABLE B

| Chemical Name | Formula A | Formula B |
|---|---|---|
| Brominated Olefin Polymer | 5.76 | |
| Ethylene Propylene Copolymer | | 9.00 |
| Ethylene Propylene Terpolymer | 1.92 | 6.00 |
| Polybutadiene Adduct & Amorphous Silica | | 1.20 |
| Aramide | 0.07 | |
| Ethylene-propylene rubber | 4.80 | |
| Ethylene Acrylate Copolymer | 4.80 | |
| Ethylene Acrylic copolymer | 1.92 | |
| Carbon Black | 0.29 | 9.00 |
| Polybutene | 26.00 | 10.54 |
| Hydrocarbon Resin | 15.10 | 1.70 |
| Calcium Carbonate Filler | 34.79 | 23.70 |
| Silica Filler | | 0.06 |
| Hydrocarbon Oil | | 14.16 |
| Polyethylene Homopolymer | | 2.00 |
| Azodicarbonamide | 0.09 | |
| Phenolic Resin | 1.00 | |
| Iron Phosphide | | 20.70 |
| Zinc Oxide | 2.00 | 1.50 |
| Sulfur | | 0.30 |
| Dipentaerythritol Pentaacrylate | 0.20 | |
| 1,1-bis(t-butylperoxy)-3,3,5-trimethyl cyclohexane & carbonic acid calcium salt & silicic acid calcium salt | 1.20 | |
| Dibenzoyl Peroxide & Dicyclohexyl Phthalate | 0.05 | |
| | 100.00 | 100.00 |

When employed, the fillers in the mesh material can range from 10% or less to 90% or greater by weight of the mesh material, but more typical from about 30 to 55% by weight of the mesh material. According to some embodiments, the mesh material may include from about 0% to about 3% by weight, and more preferably slightly less than 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

The mesh may be employed in the form of a random arrangement, or in a generally ordered relationship (e.g., according to a predetermined pattern) relative to each other. The openings formed in the mesh may be evenly spaced from one another throughout the mesh. Alternatively, the spaces in between the openings may change from opening to opening to facilitate more constricted areas in the mesh (possibility facilitating curvature of the mesh) and also looser portions of the mesh (possible to permit flat lying portions of the mesh). In one non-limiting example, the mesh may be formed into a sleeve, whereby the sleeve is more constricted about a center portion of the sleeve (e.g., the diameter is smaller around the center while the diameter is larger at the ends of the sleeve).

Figure 2:
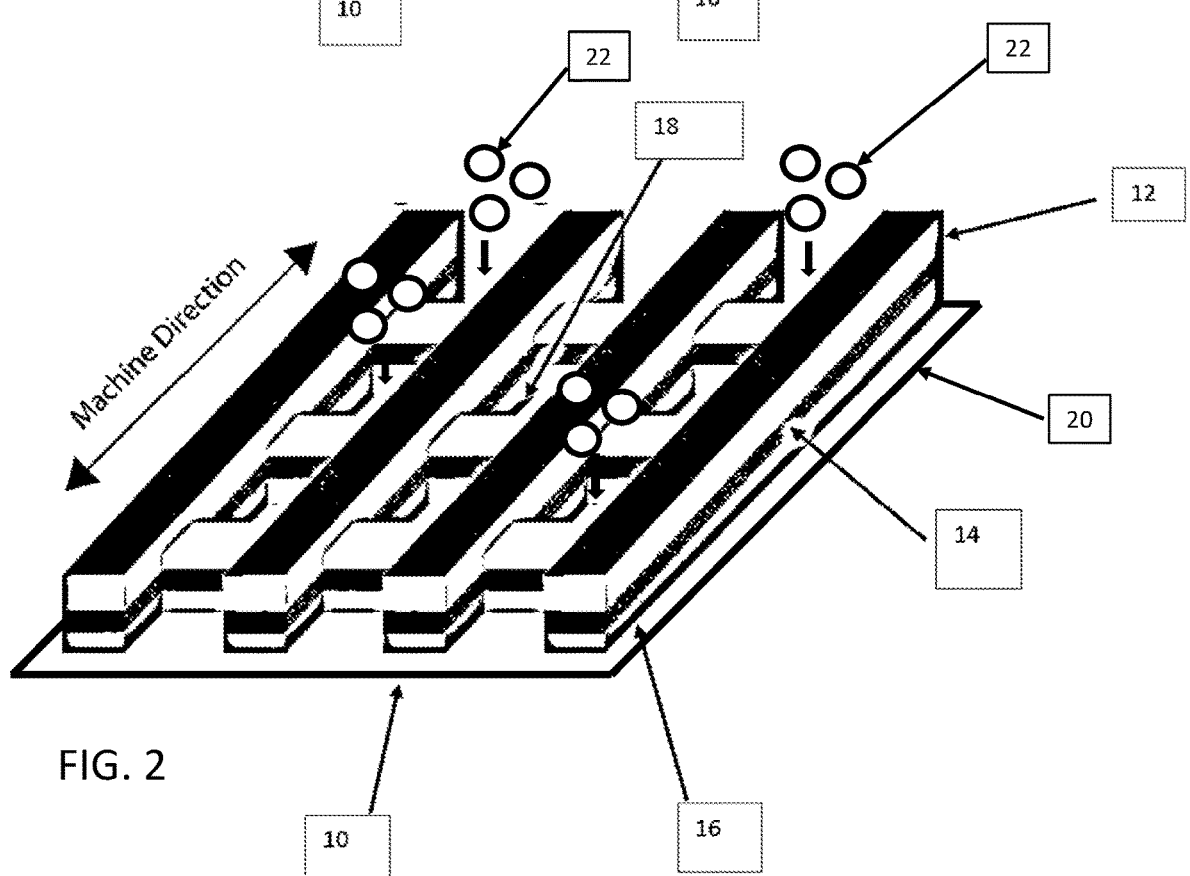
FIG. 2 is a perspective view of a mesh applied to a solid material layer.

As shown for example in FIGS. 1 and 2, the mesh 10 may include multiple layers including a first layer 12, a second layer 14, and a third layer 16. It is possible that each layer 12, 14, 16 comprises a different material or one or more of the layers 12, 14, 16 may comprise the same material as another layer. The mesh 10 further includes a plurality of openings 18 formed in the material. Additionally, as shown in FIG. 2, the mesh 10 may be disposed on a solid material layer 20. A plurality of particles, such as spheres, metallic spheres, or the like may be positioned in the openings 18 of the mesh 10 on the solid material layer 20.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An article, comprising:
   a first flexible mesh layer pliable enough for being arranged in direct planar contact with a contoured surface, the mesh layer comprising an activatable material and providing one or more attributes of adhering, sealing, reinforcing or acting as a handling film to a surface receiving the mesh layer;
   a second flexible mesh layer disposed over the first flexible mesh layer and extending in a direction perpendicular to the first flexible mesh layer, thereby forming openings between the first flexible mesh layer and the second flexible mesh layer;
   a solid material layer which receives the first flexible mesh layer; and
   a plurality of rigid spheres dispersed on a surface of the solid material layer and positioned within the openings between the first flexible mesh layer and the second flexible mesh layer prior to activation of the activatable material;
   wherein the first flexible mesh layer is an attachment layer to secure the article to the contoured surface and the second flexible mesh layer is a stiffening layer.

2. The article of claim 1, wherein the solid material layer is an adhesive or sealant material.

3. The article of claim 1, wherein the solid material layer has a thickness (t) and the plurality of rigid spheres have a max diameter (d) wherein the thickness t is greater than the max diameter d.

4. The article of claim 1, wherein the plurality of rigid spheres are metallic.

5. The article of claim 4, wherein the plurality of rigid spheres comprise aluminum oxide spheres.

6. The article of claim 1, further comprising a metallic filler included in the activatable material.

7. The article of claim 6, wherein the metallic filler allows for induction heating of the activatable material.

8. The article of claim 1, wherein the article is located in contact with an end of a drain tube to seal an interface between a drain tube and vehicle structure to which the drain tube is attached.

9. The article of claim 1, wherein the article is formed as a sleeve having a diameter smaller about a central portion than a diameter near an end of the sleeve.

10. The article of claim 1, wherein the activatable material is an expandable material.

11. The article of claim 1, wherein the first flexible mesh layer is sufficiently flexible that it collapses under its own weight when held at one end.

12. The article of claim 2, wherein the first flexible mesh layer and the second flexible mesh layer are formed having a plurality of repeating generally diamond shaped, rectangular, circular or square openings.

13. The article of claim 1, wherein a fastener is located into one of the openings between the first flexible mesh layer and the second flexible mesh layer to hold the article in place at a desired location.

14. The article of claim 13, wherein the fastener has a head portion having a diameter that is larger than the diameter of the opening that receives the fastener.

15. The article of claim 1, wherein the activatable material expands upon exposure to a stimulus and any openings in the article become closed as a result of expansion of the material.

16. The article of claim 15, wherein the openings formed in the article allow for a consistent thickness of the activatable material post expansion and prevents unwanted surface irregularities from forming in the expanded material.

17. The article of claim 1, wherein the activatable material includes a magnetic filler allowing the first flexible mesh layer to be magnetically adhered to a metallic surface prior to activation.

18. The article of claim 1, wherein the first flexible mesh layer is included as a layer within a composite structure.

19. The article of claim 4, wherein the plurality of rigid spheres are adhered to the solid material layer and at least 8 metallic spheres are located in each of the openings.

20. The article of claim 1, further comprising a third flexible mesh layer disposed over the second flexible mesh layer and extending in a direction perpendicular to the second flexible mesh layer and parallel to the first flexible mesh layer, wherein the third flexible mesh layer is a fiberglass bonding layer.

\* \* \* \* \*